United States Patent [19]

Rosaen et al.

[11] 4,299,696
[45] Nov. 10, 1981

[54] FLUID FILTERING DEVICE

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 127,227

[22] Filed: Mar. 4, 1980

Related U.S. Application Data

[63] Continuation of Ser. No. 936,071, Aug. 23, 1978, abandoned.

[51] Int. Cl.³ .................. B01D 27/10; B01D 35/02
[52] U.S. Cl. .................. 210/120; 210/130; 210/136; 210/172; 210/238; 210/448; 210/DIG. 14
[58] Field of Search ............... 210/90, 120, 130, 132, 210/168, 172, 234, 235, 446, 448, DIG. 14, 238, 136, 416.1

[56] References Cited

U.S. PATENT DOCUMENTS

| 2,041,043 | 5/1936 | Bennett | 210/446 |
|---|---|---|---|
| 2,078,543 | 4/1937 | Salisbury | 210/448 X |
| 2,447,144 | 8/1948 | Thornton | 210/120 |
| 3,368,680 | 2/1968 | Bozek | 210/234 X |
| 3,486,622 | 12/1969 | Rosaen et al. | 210/172 X |
| 3,487,930 | 1/1970 | Rosaen | 210/172 X |
| 3,519,131 | 7/1970 | Rosaen et al. | 210/90 |
| 3,628,662 | 12/1971 | Kudlaty | 210/234 X |
| 3,747,761 | 7/1973 | Heinrich, Jr. | 210/172 X |
| 4,042,505 | 8/1977 | Waggoner | 210/132 |
| 4,167,483 | 9/1979 | Rosaen et al. | 210/130 |

Primary Examiner—Robert H. Spitzer
Attorney, Agent, or Firm—Gifford, VanOphem, Sheridan & Sprinkle

[57] ABSTRACT

A fluid filtering device is provided which is particularly suitable for connection with the suction line of a hydraulic pump. The fluid filtering device comprises an elongated tubular cylindrical housing open at each end and which has at least its lower end submerged in a reservoir of the fluid to be filtered. An elongated filter assembly includes an extension tube and tubular cylindrical filter element detachably coaxially connected at one end to the extension tube. The filter assembly is axially insertable into the housing so that the filter element is positioned below the fluid level of the reservoir. Upon insertion, both axial ends of the filter element sealingly engage the interior walls of the housing while the filter element is spaced radially inwardly from the housing and thus forming an annular outlet chamber. Fluid flows from the bottom housing, through the filter element, to the annular chamber and out through a fluid connector open to the annular chamber. Preferably, a differential pressure responsive bypass valve is fluidly connected between the annular chamber and the reservoir wherein said bypass valve opens upon a predetermined differential pressure across the filter element.

10 Claims, 3 Drawing Figures

FLUID FILTERING DEVICE

CROSS REFERENCE TO RELATED APPLICATIONS

This is a continuation of application Ser. No. 936,071, filed Aug. 23, 1978 now abandoned.

BACKGROUND OF THE INVENTION

I. Field of the Invention

The present invention relates to fluid filtering devices and, more particularly, to such a device adapted for connection to the suction line of a hydraulic pump.

II. Description of the Prior Art

Hydraulic fluid systems conventionally include a reservoir of hydraulic fluid, a suction line from the reservoir and to a hydraulic pump, and a return line from a hydraulic powered system to the reservoir. During operation of the hydraulic system a certain amount of contamination of the hydraulic fluid inherently occurs. These contaminates within the hydraulic fluid must be filtered from the fluid in order to prevent damage to the hydraulic system.

It has been the previous practice to connect fluid filtering devices on either the return line from the hydraulic system to the reservoir or, alternatively, to connect the fluid filtering device on the suction line from the reservoir into the hydraulic pump. Neither of these techniques, however, have heretofore proven entirely satisfactory in operation for the following reasons.

The connection of a filter device on the return line from the hydraulic system creates a back pressure to the hydraulic system as the filter element becomes clogged and thus disadvantageously reduces the overall efficiency of the hydraulic system. Conversely, connection of the fluid filtering device on the suction line can cause pump cavitation as the filter element clogs and such pump cavition can rapidly damage or even destroy the hydraulic pump. Consequently, the condition of the filter element must be carefully monitored when a fluid filtering device is connected to the suction line of the hydraulic pump.

A still further disadvantage of the previously known fluid filtering devices for hydraulic systems is that the fluid flow must be interrupted in order to replace or clean the filter element. The interruption of fluid flow, of course, results in down time for the hydraulic system and thus decreases the net work output from the system.

In still other types of hydraulic filtering devices, a filter assembly is insertable within a tubular and cylindrical housing having its lower end positioned within the fluid reservoir. The filter assembly further includes a tubular extension member having a cap formed at one end and a filter element secured to its other end. When the filter element becomes clogged, however, the entire filter assembly is removed, discarded and replaced by a new filter assembly. Disposal of the entire filter assembly, however, is unnecessarily expensive since, with the exception of the filter element itself, the remaining components of the filter assembly are reuseable.

SUMMARY OF THE PRESENT INVENTION

The present invention provides a novel fluid filtering device particularly adapted for connection to the suction line of a hydraulic pump and which overcomes all of the above mentioned disadvantages of the previously known filtering devices.

In brief, the fluid filtering device of the present invention comprises an elongated tubular cylindrical housing open at each end and having its lower end submerged within a fluid reservoir. As will become hereinafter apparent, the submerged lower end of the housing forms the inlet to the filtering device while a fluid connector attached to the housing and extending radially outwardly therefrom and below the fluid level of the reservoir forms the fluid outlet from the filtering device.

An elongated filter assembly is further provided and comprises a tubular cylindrical filter element detachably and axially connected at one end to one end of an elongated extension tube. A cap is secured across the other end of the extension tube.

The filter assembly is axially insertable, filter element end first, into the upper end of the housing whereupon each axial end of the filter element contacts and sealingly engages the interior walls of the housing with the fluid outlet connector between the ends of the filter element. The filter element is further spaced radially inwardly from the interior walls of the housing, thus forming an annular chamber in fluid communication with the outlet connector while the interior of the filter element communicates with the reservoir through the open lower end of the housing. With the filter assembly axially positioned within the housing, the cap abuts against the top of the housing and is secured thereto by conventional means. In addition, both the filter element and the fluid outlet are positioned below the fluid level of the reservoir.

Preferably, a spring loaded and normally closed bypass valve having an inlet and outlet is connected to the housing so that its outlet is open to the annular chamber whereas its inlet is open to the reservoir. Upon a predetermined differential pressure across the filter element, the bypass valve spring compresses and opens the bypass valve to permit direct fluid flow from the reservoir and to the fluid outlet. The bypass valve thus prevents potentially damaging cavitation of the hydraulic pump connected to the outlet from the fluid filtering device.

As will become hereinafter more clearly apparent, the detachable connection between the extension tube and the filter element of the filter assembly enables the disposal of only the filter element, when dirty, and likewise enables the continued reuse of the extension tube with its attached cap. Moreover, since both fluid inlet and outlet to the fluid filtering device are positioned below the fluid level of the reservoir, the filter assembly can be removed from its housing without interruption of the fluid flow through the hydraulic system.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
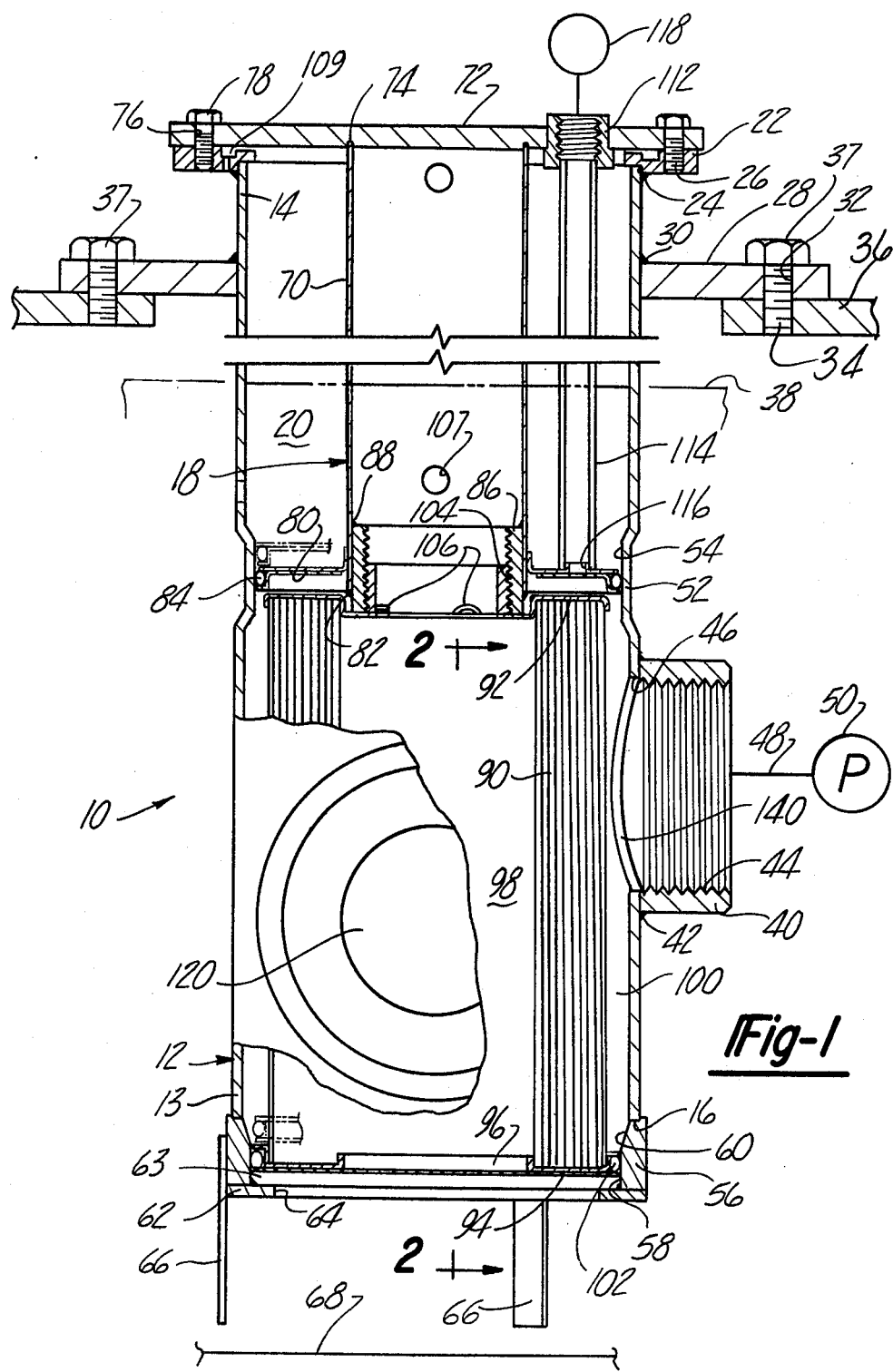
FIG. 1 is a fragmentary longitudinal sectional view illustrating the fluid filtering device of the present invention.

With reference first to FIG. 1, the fluid filtering device 10 according to the present invention is thereshown and comprises a housing 12 having an elongated tube 13 open at its upper end 14 and lower end 16. A filter assembly 18, which will subsequently be described in greater detail, is axially insertable into the interior 20 of the housing 12 from the upper end 14 of the housing 12.

Still referring to FIG. 1, an annular and radially outwardly extending flange 22 is secured around the upper end 14 of the housing 12 by welds 24 or other suitable means. A plurality of circumferentially spaced threaded bores 26 are axially provided around the flange 22.

A further mounting flange 28, which also is preferably annular in shape, is secured by welds 30 to the outer periphery of the housing 12 at a position axially spaced from the first flange 22. Axial bores 32 are provided through the mounting flange 28 which register with like bores 34 in a reservoir housing 36. Suitable fasteners, such as a bolt 37, secure the flange 28 to the reservoir housing 36 such that the lower portion of the housing 12 is positioned below the fluid level 38 within the reservoir housing 36.

A threaded fluid connector 40 shown as an internally threaded pipe, is secured by welds 42 to the housing 12 and below the fluid level 38 so that the connector 40 extends substantially radially outwardly from the housing 12. The interior 44 of the connector 40 registers with a port 46 formed through the housing so that fluid connector 40 fluidly communicates with the interior 20 of the housing. As illustrated only diagrammatically, the fluid connector 40 is connected to a suction line 48 of a hydraulic pump 50 positioned outside of the reservoir 36.

At a position spaced axially upwardly from the port 46, an inwardly projecting portion 52 is formed annularly around the housing tube 13 which in turn defines a reduced internal diameter portion 54 for the housing 12. An annular sealing ring 52 is axially connected to the open end 16 of the housing tube 13 by any conventional means. The sealing ring 52 also defines a reduced internal diameter portion 58 for the housing 12 at its lower end which tapers upwardly and outwardly via a cam surface 60 through the internal bore of the tube 13. A retainer ring 62 is secured by welds 63 to the bottom of the sealing ring 56 and has a central opening 64, smaller in diameter than the bore 58.

A plurality of circumferentially spaced and axially extending legs 66 are secured to the lower end of the housing 12 and project axially outwardly from the retainer ring 62. The legs 66 insure that the retainer ring 62 is spaced from the bottom 68 of the reservoir 36 so as not to interfere with fluid flow through the retainer ring opening 64.

Still referring to FIG. 1, the filter assembly 18 is thereshown positioned within the housing 12 in its operable position. The filter assembly 18 further includes an elongated extension tube 70 having a circular cap 72 transversely secured across its upper end 74 and which abuts against the flange 22. Circumferentially spaced axial bores 76 through the cap 72 register with the bores 26 in the annular flange 22 and through which bolts 78 extend to secure the cap 72 to the flange 22.

An annular and radially outwardly extending seal carrier 80 is secured to the lower end 82 and outer periphery of the extension tube 70. A seal member 84, such as an O-ring, is positioned around the outer periphery of the seal carrier 80. In addition, an internally threaded pipe section 86 is secured by welds 88 or the like within the interior of the extension tube 18 and at its lowermost end 82. The function of the pipe section 86 will be subsequently described.

The filter assembly 18 further includes a tubular cylindrical filter element 90 entrapped between an upper annular rim 92 and a lower annular rim 94. The lower annular rim 94 includes a central opening 96 in registration with the retainer ring opening 64 so that fluid within the reservoir 36 freely communicates with the interior 98 of the filter element 90. Moreover, the filter element 90 is spaced radially inwardly from the internal walls of the housing 12 thus defining an annular chamber 100 between the filter element 90 and the housing 12. The lower annular rim 94 also carries a seal member 102 around the outer periphery.

An externally threaded pipe section 104 is coaxially secured to the upper retainer rim 92. The pipe section 104 threadably engages the pipe section 86 so that the filter element 90 can be selectively screwed onto and off from the extension tube 70 as desired. Appropriate air vents 106, 107 and 109 are respectively provided through the upper retainer rim 92, the extension tube and the annular mounting flange 22 to enable the fluid within the reservor 36 to attain its own fluid level 38.

Figure 3:
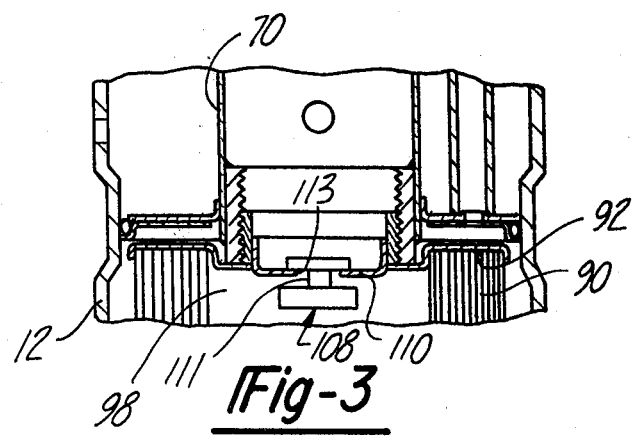
FIG. 3 is a fragmentary sectional view showing a modification of one component of the fluid filtering device of the present invention and enlarged for clarity.

With reference now to FIG. 3, as an alternative to the air vents 106, 107 and 109, a spool valve 108 having a reduced diameter central portion 111 can be used. The valve 108 is positioned through a bore 113, larger in diameter than the portion 111, in the upper rim 92 so that the rim forms a valve seat 110 for the spool valve 108. The spool valve 108 is constructed of a material lighter than the fluid within the reservoir so that as the fluid rises within the filter element 90 and contacts the valve 108, the valve 108 opens and forms an air vent to enable the fluid to completely fill the interior chamber 98 of the filter element 90. When the filter element interior chamber 98 is completely filled, however, the lower spool of the valve seat 108 abuts against and sealingly engages the valve seat 110 to prevent the entry of fluid into the interior of the extension tube 70.

Referring now again to FIG. 1, in order to monitor the pressure within the annular chamber 100, a nipple 112 is preferably secured to the cap 72 and fluidly connected by a conduit 114 and opening 116 in the annular seal carrier 80 to the annular chamber 100. A suitable pressure gauge 118 is connected to the nipple 112 and provides an exteriorly visible signal representative of the fluid pressure in the chamber 100 and thus of the degree of clogging of the filter element 90.

Figure 2:
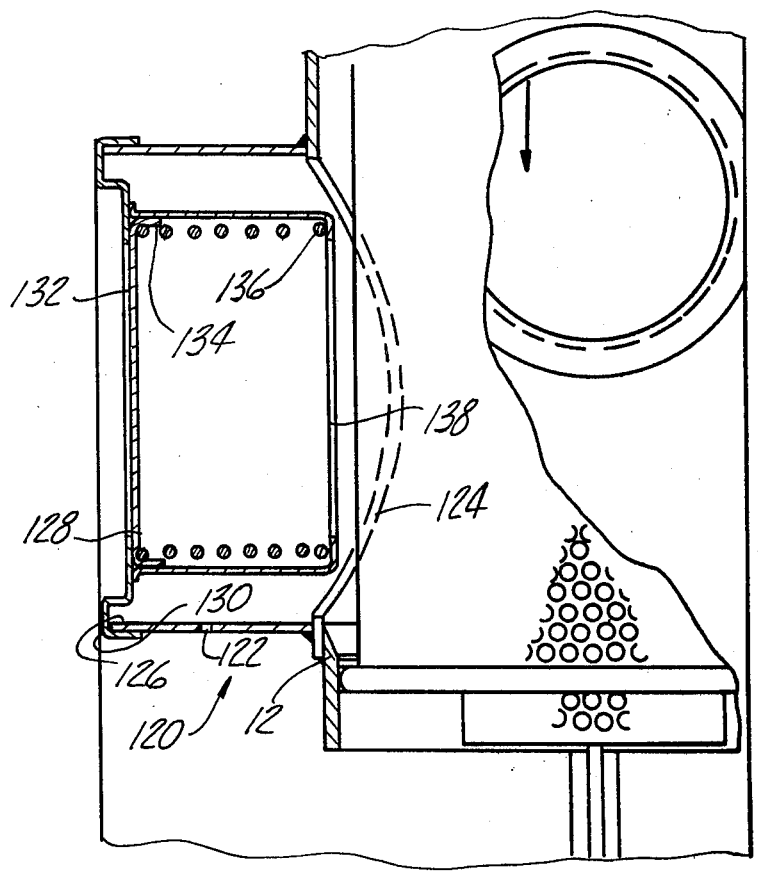
FIG. 2 is a fragmentary sectional view illustrating the bypass valve of the fluid filtering device and taken substantially along line 2—2 in FIG. 1.

With reference now to FIGS. 1 and 2, a bypass valve 120 is there shown and comprises a tubular bypass housing 122 secured to an opening 124 in the housing 12 so that the bypass housing 122 projects radially outwardly from the housing 12. An annular cap 126 with a central circular opening 128 is secured to the free end 130 of the bypass housing 122.

A circular valve member 132 with an axially extending lip 134 about its outer periphery is positioned within the housing 122 and coaxially behind the cap opening 128. A helical spring 136 abuts at one end against a support 138 and at its other end against the valve plate 132 thus sealingly urging the valve plate 132, which is larger in diameter than the cap opening 128, against the cap 130. The outwardly facing side of the valve plate 132 is open to the pressure in the reservoir 36 while the interior side of the valve plate 132 is open to the annular chamber 100 via the opening 124. Consequently, when the differential pressure across the filter element 90 exceeds a predetermined pressure, as determined by the spring 136, the valve plate 132 opens by compressing the spring 136 and establishes direct fluid communication between the fluid reservoir and the annular chamber 100.

Although the operation of the filtering device 10 according to the present invention should by now be apparent, it will be summarized briefly in the interest of clarity. The filter assembly 18 is axially inserted into the housing 12 into the position illustrated in FIG. 1. In doing so, the upper seal member 84 first sealingly engages the reduced diameter portion 54 of the housing 12 whereafter the lower seal member 102 slides along the cam surface 60 and sealingly engages the reduced diameter portion 58. In doing so, the annular chamber 100 is fluidly separated from the fluid in the reservoir by the filter element 90.

With the suction line 48 of the pump 50 connected to the outlet fluid connector 40, fluid is drawn from the reservoir and into the interior 98 of the filter element 90. The fluid then flows through the filter element 90 and into the annular chamber and out through the fluid outlet 40.

As the filter element 90 becomes clogged, the differential pressure between the chambers 90 and 100 increases. If the differential pressure increases beyond a predetermined amount, as determined by the bypass valve spring 136, the bypass valve 120 opens and establishes direct fluid communication from the reservoir and to the annular chamber 100 in order to prevent cavitation damage to the pump 50. For this reason, preferably a screen filter 140 is positioned across the outlet port 46 in the housing 12 in order to provide some filtration for the fluid.

When replacement of the filter element 90 is desired, the bolts 78 are first removed whereafter the entire filter assembly 18 is axially removed through the top 14 of the housing 12. Since the outlet 40 is below the fluid level 38 of the reservoir, however, removal of the filter assembly 18 does not interfere with the fluid flow to the pump 50. Moreover, the screen filter 140 will continue to provide some filtering action for the hydraulic fluid.

Upon removal of the filter assembly 18, however, the previous pracice of replacing the entire filter assembly 18 is avoided. Rather, the filter element 90 is simply unscrewed from the extension tube 70 and a clean filter element is screwed onto the extension tube 70. In this fashion, replacement of the entire filter assembly 18 is unnecessary when replacing filter element 90. Moreover, should the filter element 90 unintentionally fall into the housing interior 20 during its removal, the retainer ring 62 at the bottom of the housing 12 effectively prevents the filter element 90 from dropping into the reservoir.

From the foregoing it can be seen that the device 10 according to the present invention provides a new and improved fluid filtering device which is particularly suitable for attachment to the suction line of the hydraulic pump 50.

Having described my invention, however, many modifications thereto will become apparent to those skilled in the art to which it pertains without deviation from the spirit of the invention as defined by the scope of the appended claims.

I claim:
1. A fluid filtering device for use with a fluid reservoir in which fluid is contained, said filtering device comprising:
   an elongated tubular cylindrical housing open at each end and positioned within said reservoir so that one end of said housing is submerged within said fluid while the other open end of said housing is positioned above said fluid, said housing having a fluid outlet formed on one side and below the fluid level in the reservoir;
   an elongated filter assembly, said filter assembly comprising an elongated tubular extension and tubular cylindrical filter element open at one end, means for detachably coaxially connecting one end of the tubular extension to the other end of the filter element, said filter assembly being axially insertable into said housing so that said filter element is positioned at the lower end of said housing and spaced radially inwardly from said housing thus forming an annular chamber in fluid communication with the housing fluid outlet and wherein said filter element is open to the reservoir only through said one end of the filter element;
   means for fluidly sealing both axial ends of said filter element to said housing;
   means for securing the other end of said extension tube to said housing;
   air vent means formed between the interior of said filter element and the interior of said extension tube; said air vent means comprising a fluid port formed through the other end of said filter element, said port being open to the interior of said filter element and also to the interior of said tubular extension;
   a valve operatively connected with said port, said valve being normally open and including means for automatically closing when the fluid fills the interior of the filter element;
   a fluid passageway for fluidly connecting the interior of the tubular extension to the exterior of said housing, said fluid passageway being continuously open between said interior of the extension tube and the exterior of the housing.
2. The invention as defined in claim 1 wherein said detachable connecting means further comprises threaded detachable connecting means.
3. The invention as defined in claim 2, wherein said detachable connecting means further comprises a threaded pipe section coaxially secured at the upper end to said filter element and a cooperating threaded pipe section coaxially secured to the lower end of the extension tube.
4. The invention as defined in claim 1 wherein said last mentioned means comprises a cap perpendicularly secured across the upper end of said extension tube, said cap flatly abutting an annular flange on said housing and means for detachably connecting said cap to said annular flange.
5. The invention as defined in claim 1 and further comprising a screen filter positioned across said housing outlet.
6. The invention as defined in claim 1 and further comprising normally closed bypass valve means for bypassing said filter element.
7. The invention as defined in claim 6 wherein said bypass valve means further comprises a valve seat secured to said housing, a valve member cooperating with said valve seat and means for urging one side of said valve member against said valve seat, wherein said mentioned side of said valve member is open to the fluid in the reservoir whereas the other side of said valve member fluidly communicates with said housing outlet.

8. The invention as defined in claim 1 wherein said valve further comprises a spool valve having a central reduced diameter portion which is positioned through a bore in a valve seat at the upper end of the filter element, said valve being constructed of a material lighter than the fluid whereby, upon contact with fluid, said spool valve lifts and sealingly engages said valve seat.

9. The invention as defined as claim 1 wherein said means for fluidly sealing the axial ends of said filter element further comprises an annular resilient member which engages a reduced diameter portion of said housing upon the insertion of said filter assembly into said housing.

10. A fluid filtering device for use with a fluid reservoir in which fluid is contained, said filtering device comprising:

an elongated tubular cylindrical housing open at each end and positioned within said reservoir so that one end of said housing is submerged within said fluid while the other open end of said housing is positioned above said fluid, said housing having a fluid outlet formed on one side and below the fluid level in the reservoir;

an elongated filter assembly, said filter assembly comprising an elongated tubular extension and tubular cylindrical filter element open at one end, means for detachably coaxially connecting one end of the tubular extension to the other end of the filter element, said filter assembly being axially insertable into said housing so that said filter element is positioned from said housing thus forming an annular chamber in fluid communication with the housing fluid outlet;

means for fluidly sealing both axial ends of said filter element to said housing;

means for securing the other end of said extension tube to said housing;

air vent means formed between the interior of said filter element and the interior of said extension tube; said air vent means comprising a fluid port formed through the other end of said filter element, said port being open to the interior of said filter element and also to the interior of said tubular extension;

a valve operatively connected with said port, said valve being normally open and including means for automatically closing when the fluid fills the interior of the filter element;

a fluid passage means for fluidly connecting the interior of the tubular extension to the exterior of said housing, normally closed bypass means for bypassing said filter element, said bypass means comprising a tubular bypass housing secured at one end to said tubular cylindrical housing at a position below the fluid level in the reservoir so that said bypass housing registers with an opening in the tubular cylindrical housing and is open to said annular chamber and so that said bypass housing extends outwardly from said cylindrical housing, a valve seat secured to the other end of the bypass housing, a valve member cooperating with the valve seat, and means for urging said valve member against the valve seat wherein one side of the valve member is open to the reservoir while the other side of said valve member is open to the annular chamber and wherein said bypass means is wholly positioned outside of the interior of said tubular cylindrical housing.

* * * * *

UNITED STATES PATENT AND TRADEMARK OFFICE
CERTIFICATE OF CORRECTION

PATENT NO. : 4,299,696
DATED : November 10, 1981
INVENTOR(S) : Borje O. Rosaen, Dale P. Fosdick It is certified that error appears in the above-identified patent and that said Letters Patent are hereby corrected as shown below:

Col. 1, line 39, delete "cavition", insert --cavitation--.

Col. 5, line 48, delete "pracice", insert --practice--.

Signed and Sealed this

Ninth Day of February 1982

[SEAL]

Attest:

GERALD J. MOSSINGHOFF

Attesting Officer   Commissioner of Patents and Trademarks